United States Patent
Shioi et al.

(10) Patent No.: US 7,796,808 B2
(45) Date of Patent: Sep. 14, 2010

(54) IMAGE DATA CREATION DEVICE AND IMAGE DATA REPRODUCTION DEVICE FOR REPRODUCING THE DATA

(75) Inventors: Masahiro Shioi, Chiba (JP); Ken Mashitani, Neyagawa (JP)

(73) Assignees: Sharp Kabushiki Kaisha, Osaka-shi (JP); Sanyo Electric Co., Ltd., Osaka (JP)

( * ) Notice: Subject to any disclaimer, the term of this patent is extended or adjusted under 35 U.S.C. 154(b) by 338 days.

(21) Appl. No.: 10/541,232

(22) PCT Filed: Jan. 20, 2004

(86) PCT No.: PCT/JP2004/000418

§ 371 (c)(1),
(2), (4) Date: Apr. 24, 2006

(87) PCT Pub. No.: WO2004/066639

PCT Pub. Date: Aug. 5, 2004

(65) Prior Publication Data
US 2006/0257016 A1 Nov. 16, 2006

(30) Foreign Application Priority Data
Jan. 20, 2003 (JP) .............................. 2003-011472

(51) Int. Cl.
*G06K 9/00* (2006.01)
(52) U.S. Cl. .................................... 382/154
(58) Field of Classification Search ........................ None
See application file for complete search history.

(56) References Cited

U.S. PATENT DOCUMENTS 5,923,869 A 7/1999 Kashiwagi et al.
6,393,574 B1 5/2002 Kashiwagi et al.
6,470,460 B1 10/2002 Kashiwagi et al.

(Continued)

FOREIGN PATENT DOCUMENTS

EP 0 888 018 A1 12/1998

(Continued)

OTHER PUBLICATIONS

XP-002477340 TI - General Purpose Stereoscopic Data Descriptor, pp. 1-6, 1997.

(Continued)

*Primary Examiner*—Vikkram Bali
*Assistant Examiner*—Elisa M Rice
(74) *Attorney, Agent, or Firm*—Birch, Stewart, Kolasch & Birch, LLP

(57) ABSTRACT

A controller (101) designates whether images are integrated or not and image placement mode when integration is implemented. An image integrator (102) creates image data in a format designated by the presence/absence of integration and placement mode. A 3D information generator (103) generates 3D information necessary for 3D image display by formatting the presence/absence of integration and the placement mode. An encoder (104) encodes the image data created by image integrator (102) and generates coded data. A multiplexer (105) converts the encoded data generated by encoder (104) and the 3D information created by the 3D information generator into a predetermined format and outputs the result to the outside. This arrangement enables image data for 3D display to be versatile.

10 Claims, 15 Drawing Sheets

| Index | Statement of integrated image |
|---|---|
| 0 | Image at standard position |
| 1 | Image after 90 degrees clockwise rotated placement |
| 2 | Image after 180 degrees clockwise rotated placement |
| 3 | Image after 270 degrees clockwise rotated placement |
| 4 | Image after a 90 degrees clockwise rotation of the integrated image |
| 5 | Image after a 180 degrees clockwise rotation of the integrated image |
| 6 | Image after a 270 degrees clockwise rotation of the integrated image |
| 7 | Image after a 90 degrees clockwise rotation of every viewpoint image |
| 8 | Image after a 180 degrees clockwise rotation of every viewpoint image |
| 9 | Image after a 270 degrees clockwise rotation of every viewpoint image |

U.S. PATENT DOCUMENTS

| | | |
|---|---|---|
| 6,507,358 B1 | 1/2003 | Mori et al. |
| 6,573,819 B1 | 6/2003 | Oshima et al. |
| 6,574,423 B1 | 6/2003 | Oshima et al. |
| 6,603,876 B1 | 8/2003 | Matsuo et al. |
| 6,925,250 B1 | 8/2005 | Oshima et al. |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2002/0030675 A1 | 3/2002 | Kawai |
| 2002/0122585 A1* | 9/2002 | Swift et al. ............ 382/154 |
| 2003/0048354 A1 | 3/2003 | Takemoto et al. |
| 2003/0053797 A1 | 3/2003 | Oshima et al. |
| 2003/0108341 A1 | 6/2003 | Oshima et al. |
| 2003/0128273 A1 | 7/2003 | Matsui et al. |
| 2003/0137913 A1 | 7/2003 | Oshima et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |

FOREIGN PATENT DOCUMENTS

| | | |
|---|---|---|
| EP | 0 944 269 A1 | 9/1999 |
| EP | 971261 A2 * | 1/2000 |
| EP | 1693844 A2 * | 8/2006 |
| JP | 5-30538 A | 2/1993 |
| JP | 8-317425 A | 11/1996 |
| JP | 10-336705 A | 12/1998 |
| JP | 11-041627 A | 2/1999 |
| JP | 11-127369 A | 5/1999 |
| JP | 11-191895 A | 7/1999 |
| JP | 2000-197074 A | 7/2000 |
| JP | 2001-197521 A | 7/2001 |
| JP | 2002-095018 A | 3/2002 |
| JP | 2003-111101 A | 4/2003 |
| WO | WO 9732437 A1 * | 9/1997 |
| WO | WO-01/97531 A2 | 12/2001 |

OTHER PUBLICATIONS

XP008022012, A. Woods, et al., "A PC-Based Steroscopic Video Walkthrough", SPIE, vol. 3639, pp. 306-312, Jan. 1999.

* cited by examiner

FIG. 3
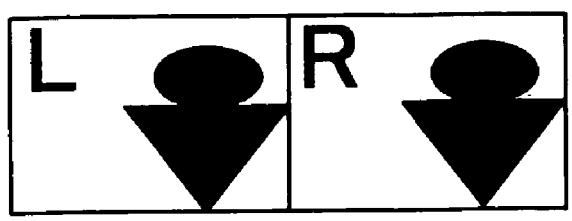
(a)
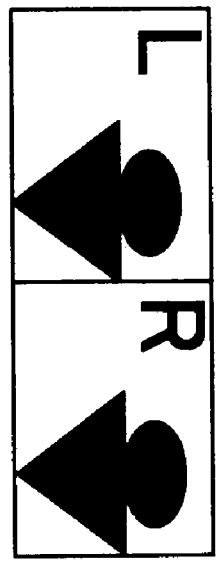
(b)
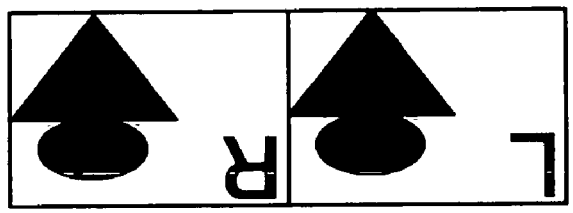
(c)
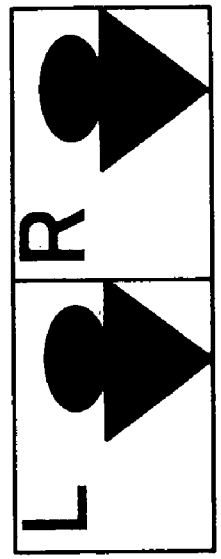
(d)

FIG. 4
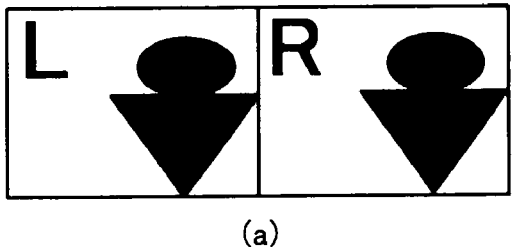
(a)
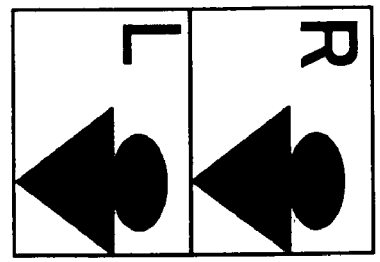
(b)
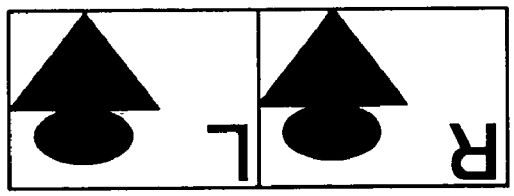
(c)
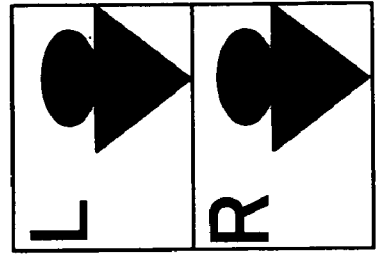
(d)
FIG. 5
| Index | Placement mode |
|---|---|
| 0 | Standard position |
| 1 | 90 degrees clockwise rotated placement |
| 2 | 180 degrees clockwise rotated placement |
| 3 | 270 degrees clockwise rotated placement |

FIG. 6

| Index | Presence/absence of integration | Placement mode |
|---|---|---|
| 0 | Integration absent | — |
| 1 | Integration present | Standard position |
| 2 | Integration present | 90 degrees clockwise rotated placement |
| 3 | Integration present | 180 degrees clockwise rotated placement |
| 4 | Integration present | 270 degrees clockwise rotated placement |

FIG. 7

| Index | Direction of placement |
|---|---|
| 0 | Left and right placement |
| 1 | Top and bottom placement |

(a)

| Index | Order of placement |
|---|---|
| 0 | Viewpoint order |
| 1 | Reverse order |

(b)

| Placement direction index value | Placement order index value | Placement mode |
|---|---|---|
| Left and right placement | Viewpoint order | Standard position |
| Left and right placement | Reverse order | 90 degrees clockwise rotated placement |
| Top and bottom placement | Viewpoint order | 180 degrees clockwise rotated placement |
| Top and bottom placement | Reverse order | 270 degrees clockwise rotated placement |

| Index | Placement mode |
|---|---|
| 0 | Standard position |
| 1 | 90 degrees clockwise rotated placement |
| 2 | 180 degrees clockwise rotated placement |
| 3 | 270 degrees clockwise rotated placement |

(a)

| Index | Degree of rotation of integrated image |
|---|---|
| 0 | Standard position |
| 1 | 90 degrees clockwise rotation |
| 2 | 180 degrees clockwise rotation |
| 3 | 270 degrees clockwise rotation |

(b)

| Index | Degree of rotation of each viewpoint image |
|---|---|
| 0 | Standard position |
| 1 | 90 degrees clockwise rotation |
| 2 | 180 degrees clockwise rotation |
| 3 | 270 degrees clockwise rotation |

| Index | Statement of integrated image |
|---|---|
| 0 | Image at standard position |
| 1 | Image after 90 degrees clockwise rotated placement |
| 2 | Image after 180 degrees clockwise rotated placement |
| 3 | Image after 270 degrees clockwise rotated placement |
| 4 | Image after a 90 degrees clockwise rotation of the integrated image |
| 5 | Image after a 180 degrees clockwise rotation of the integrated image |
| 6 | Image after a 270 degrees clockwise rotation of the integrated image |
| 7 | Image after a 90 degrees clockwise rotation of every viewpoint image |
| 8 | Image after a 180 degrees clockwise rotation of every viewpoint image |
| 9 | Image after a 270 degrees clockwise rotation of every viewpoint image |

FIG. 10

| Index | Mode of rotation |
|---|---|
| 0 | Non – rotation |
| 1 | Placement rotation |
| 2 | Rotatian of the integrated image |
| 3 | Rotation of every viewpoint image |

(a)

| Index | Angle of rotation |
|---|---|
| 1 | 90 degrees clockwise |
| 2 | 180 degrees clockwise |
| 3 | 270 degrees clockwise |

(b)

FIG. 15
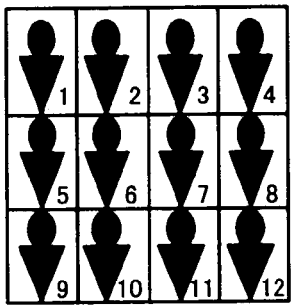
(a)
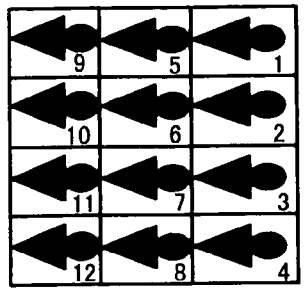
(b)
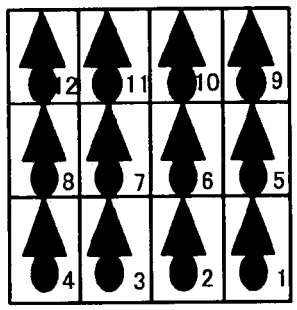
(c)
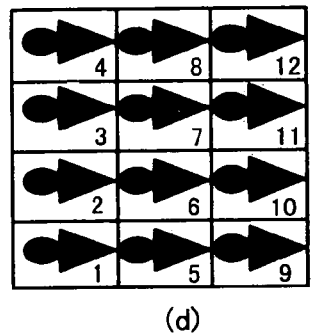
(d)
FIG. 16
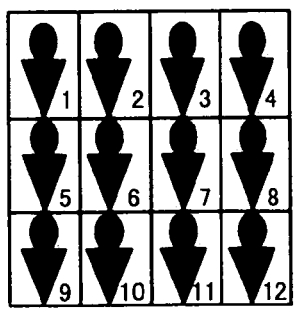
(a)
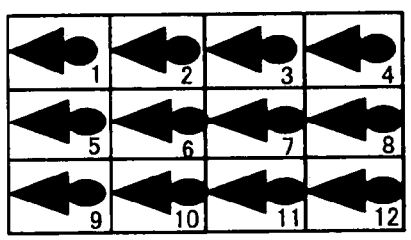
(b)
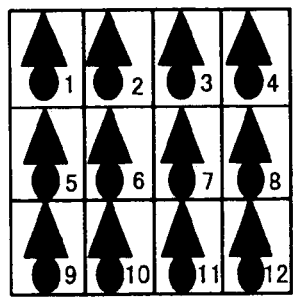
(c)
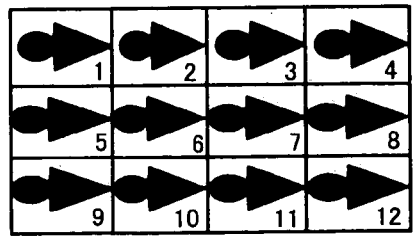
(d)

FIG. 17

| Index | Placement mode |
|---|---|
| 0 | Standard position |
| 1 | 90 degrees clockwise rotated placement |
| 2 | 180 degrees clockwise ratated placement |
| 3 | 270 degrees clookwise rotated placement |
| 4 | Left and right inversion |
| 5 | Top-to-bottom inversion |
| 6 | 90 degrees clockwise rotation and top-to-bottom inversion |
| 7 | 90 degrees clockwise rotation and left and right inversion |

FIG. 18

| Index | Presence/absence of integration | Placement mode |
|---|---|---|
| 0 | Integration absent | — |
| 1 | Integration present | Standard position |
| 2 | Integration present | 90 degrees clockwise rotated placement |
| 3 | Integration present | 180 degrees clockwise ratated placement |
| 4 | Integration present | 270 degrees clookwise rotated placement |
| 5 | Integration present | Left and right inversion |
| 6 | Integration present | Top-to-bottom inversion |
| 7 | Integration present | 90 degrees clockwise rotation and top-to-bottom inversion |
| 8 | Integration present | 90 degrees clockwise rotation and left and right inversion |

FIG. 19

| Index | Direction of placement |
|---|---|
| 0 | Standard position |
| 1 | 90 degrees clockwise rotated placement |
| 2 | 180 degrees clockwise rotated placement |
| 3 | 270 degrees clockwise rotated placement |

(a)

| Index | Direction of placement |
|---|---|
| 0 | Standard position |
| 1 | Left and right inversion |

| Index | Presence/absence of integration | Placement mode |
|---|---|---|
| 0 | Integration absent | — |
| 1 | Integration present | Standard position |
| 2 | Integration present | 90 degrees clockwise rotated placement |
| 3 | Integration present | 180 degrees clockwise rotated placement |
| 4 | Integration present | 270 degrees clockwise rotated placement |

(a)

| Index | Direction of placement |
|---|---|
| 0 | Standard position |
| 1 | Left and right inversion |

(b)

L : Left-eye image
R : Right-eye image

FIG. 23
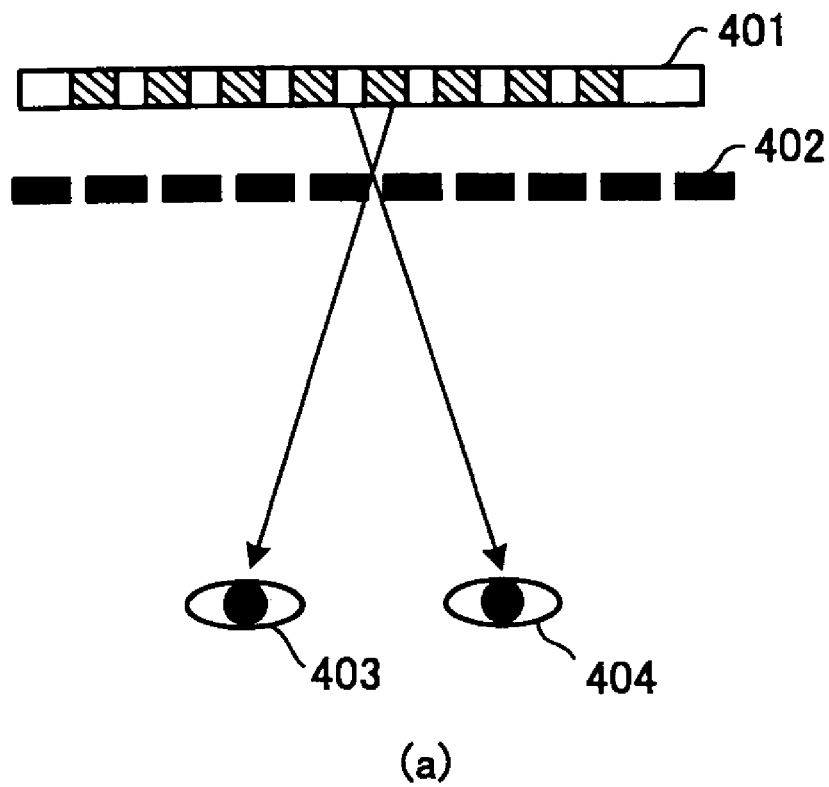
(a)
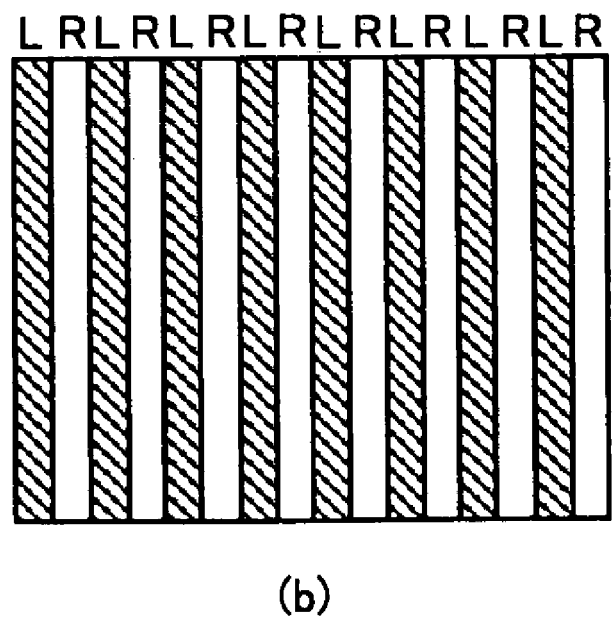
(b)

FIG. 24
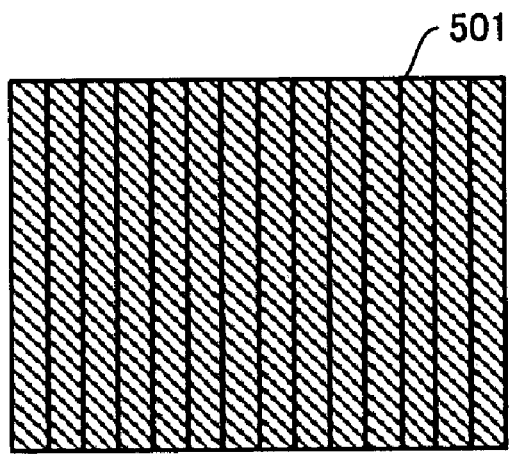
(a)
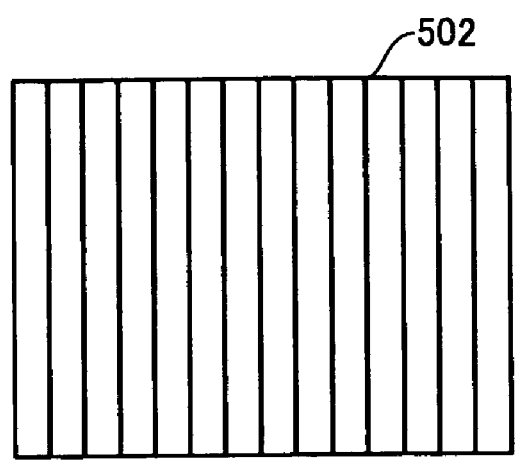
(b)
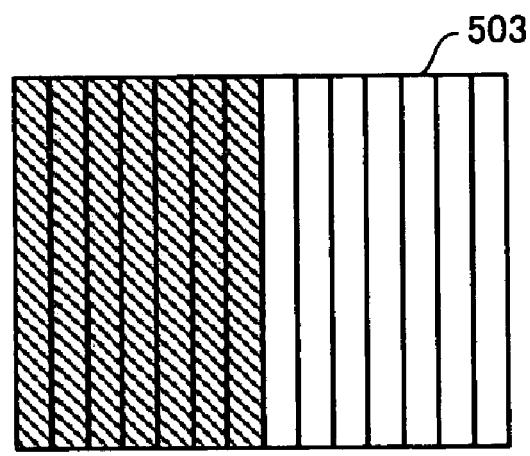
(c)

(12)	United States Patent	US 7,796,808 B2

IMAGE DATA CREATION DEVICE AND IMAGE DATA REPRODUCTION DEVICE FOR REPRODUCING THE DATA

TECHNICAL FIELD

The present invention relates to an image data generating apparatus for adding attribute information to image data when image data for 3-dimensional display is prepared and also relates to an image data reproducing apparatus for reproducing the data.

BACKGROUND ART

Conventionally, various methods have been proposed which display 3-dimensional images. Of these, "binocular methods" using binocular parallax are generally used. Specifically, a stereoscopic vision is achieved by providing left- and right-eye images having binocular parallax and projecting them separately on left and right eyes, respectively.

FIG. 22 is a conceptual view for illustrating a "time-division scheme" as one of the typical binocular methods.

In this time-division scheme, the left-eye image and right-eye image are interlaced on alternate horizontal lines of one pixel as shown in FIG. 22, so that the left-eye image and right-eye image will be switched and displayed alternately. The left-eye image and right-eye image therefore have half the vertical resolution compared to that in normal 2-dimensional display mode. An observer should put on shutter glasses that open and close in synchronism with the switching period of the display. The shutter used here opens the left-eye side and closes the right-eye side when the left-eye image is displayed and closes the left-eye side and opens the right-eye side when the right-eye image is displayed. With this arrangement, the left-eye image is observed by the left eye alone while the right-eye image is observed by the right eye alone, to achieve the stereoscopic vision.

FIG. 23 is a conceptual view for illustrating another typical scheme of the binocular methods, namely "parallax barrier scheme".

FIG. 23(a) is a view showing the principle of the cause of parallax. FIG. 23(b) is a view showing an image frame displayed in the parallax barrier scheme.

In FIG. 23(a), an image in which the left-eye image and right-eye image are interlaced on alternate vertical lines of one pixel as shown in FIG. 23(b), is displayed on an image display panel 401 while a parallax barrier 402 with slits having a slit width smaller than the interval between the pixels for an identical viewpoint is placed in front of image display panel 401, whereby the left-eye image is observed by the left eye 403 alone while the right-eye image is observed by the right eye 404 alone, to achieve the stereoscopic vision.

Incidentally, there is another method, the "lenticular scheme" for achieving 3-dimensional display of an image as shown in FIG. 23(b), which is similarly to the parallax barrier scheme. One example of recording data format used in the lenticular scheme is disclosed by Japanese Patent Application Laid-open Hei 11-41627.

FIG. 24 is a conceptual view showing one example of recording data format of the lenticular scheme. A left-eye image 501 as shown in FIG. 24(a) and a right-eye image 502 as shown in FIG. 24(b) are each thinned to half with respect to the horizontal direction, forming and recording a frame of complex image 503 as shown in FIG. 24(c). Upon reproduction, this complex image 503 is rearranged to form a composite image as shown in FIG. 23(b).

As stated above, in conventional 3D display systems, recording of data is done in a fixed recording data format so as to be suited to the display scheme determined on the playback apparatus side, hence no consideration has been taken to make recording data versatile.

Three-dimensional display involves various necessary information such as the number of viewpoints, the method of thinning and the like other than the display scheme, these pieces of information are not recorded as the recorded data when a single display scheme is used. It is true that if only one identical display scheme is always used, it is not necessary to record these pieces information, but the versatility of recording data is markedly reduced because of this. Just referring to the limited cases where data for the parallax barrier scheme (or the lenticular scheme) is to be recorded, the left-eye image and right-eye image may be recorded as separate sequences, the data may be recorded as a mixed image in which the left-eye image and right-eye image are arranged horizontally half-and-half in one frame as shown in FIG. 24(c), or the data may be recorded as a composite image in which the left-eye image and right-eye image are interlaced on alternate vertical lines of one pixel as shown in FIG. 23(b). Naturally, data of different recording formats should be handled by different processes for display, but since it is impossible to know the data format of data from the recorded data, there is a problem in that it is impossible to know how the data should be processed for display when a third person gets the data.

The present invention has been devised to solve the above problems, it is therefore an object of the present invention to provide an image data generating apparatus for facilitating provision of versatility of image data for 3-dimensional display as well as providing an image data reproducing apparatus for reproducing the data.

DISCLOSURE OF INVENTION

In order to attain the above object, an image data generating apparatus for generating image data of a predetermined data format from a plurality of images corresponding to a plurality of viewpoints, comprising: an information generating means for generating an integration information that indicates whether images from different viewpoints have been integrated or not and an image placement information that indicates a placement mode of the images from different viewpoints when the images are integrated, is characterized in that the data format includes the integration information and the image placement information.

It is also characterized in that the image placement information is information on the placement mode in which the viewpoint images are positioned by rotation of a predetermined angle.

It is also characterized in that the predetermined angle is one or plural among 0 degrees, 90 degrees clockwise, 180 degrees clockwise and 270 degrees clockwise.

It is also characterized in that the image placement information is composed of a placement direction information that indicates whether the images are arranged vertically or horizontally and a placement order information that indicates whether the images are arranged in an order of the viewpoints or in a reverse order of the viewpoints.

It is also characterized in that the image placement information is information on the placement mode of the images in which placements of the viewpoint images are positioned by rotation of a predetermined angle, information on the placement mode of the images in which positions of the images are inverted in a predetermined direction based on a positional relationship of the viewpoints, or information on a combined mode of the two placement modes.

It is also characterized in that the predetermined angle is one or plural among 0 degrees, 90 degrees clockwise, 180 degrees clockwise and 270 degrees clockwise, and the predetermined direction is one or plural among a horizontal direction and a vertical direction.

Further, an image data reproducing apparatus for reproducing a plurality of images corresponding to a plurality of viewpoints, from image data of a predetermined data format, comprising: an analyzing means for analyzing the predetermined data format, is characterized in that the analyzing means analyzes an integration information that indicates whether images from different viewpoints have been integrated or not and an image placement information that indicates a placement mode of the images having been integrated, and reproduces the plurality of images using the integration information and the image placement information.

It is also characterized in that the image placement information is information on the placement mode in which the viewpoint images are positioned by rotation of a predetermined angle.

It is also characterized in that the predetermined angle is one or plural among 0 degrees, 90 degrees clockwise, 180 degrees clockwise and 270 degrees clockwise.

It is also characterized in that the image placement information is composed of a placement direction information that indicates whether the images are arranged vertically or horizontally and a placement order information that indicates whether the images are arranged in an order of the viewpoints or in a reverse order of the viewpoints.

It is also characterized in that the image placement information is information on the placement mode of the images in which placements of the viewpoint images are positioned by rotation of a predetermined angle, information on the placement mode of the images in which positions of the images are inverted in a predetermined direction based on a positional relationship of the viewpoints, or information on a combined mode of the two placement modes.

It is also characterized in that the predetermined angle is one or plural among 0 degrees, 90 degrees clockwise, 180 degrees clockwise and 270 degrees clockwise, and the predetermined direction is one or plural among a horizontal direction and a vertical direction.

According to the present invention, the present invention has the following effects.

According to the present invention, since the image data generating apparatus for generating image data of the predetermined data format from the plurality of images corresponding to the plurality of viewpoints, comprising: the information generating means for generating the integration information that indicates whether images from different viewpoints have been integrated or not and the image placement information that indicates the placement mode of the images from different viewpoints when the images are integrated, wherein the data format includes the integration information and the image placement information, it is possible to provide an advantageous effect that image data for 3D display can be made versatile.

Since the image placement information is the information on the placement mode in which placements of the viewpoint images are positioned by rotation of the predetermined angle, it is possible to provide an advantageous effect that that image data for 3D display can be made versatile.

Since the predetermined angle is one or plural among 0 degrees, 90 degrees clockwise, 180 degrees clockwise and 270 degrees clockwise, it is possible to provide an advantageous effect that that image data for 3D display can be made versatile.

Since the image placement information is composed of the placement direction information that indicates whether the images are arranged vertically or horizontally and the placement order information that indicates whether the images are arranged in the order of the viewpoints or in the reverse order of the viewpoints, it is possible to provide an advantageous effect that that image data for 3D display can be made versatile.

Since the image placement information is the information on the placement mode of the images in which the placements of the viewpoint images are positioned by rotation of the predetermined angle, the information on the placement mode of the images in which the positions of the images are inverted in the predetermined direction based on the positional relationship of the viewpoints, or the information on the combined mode of the two placement modes, it is possible to provide an advantageous effect that that image data for 3D display can be made versatile.

Since the predetermined angle is one or plural among 0 degrees, 90 degrees clockwise, 180 degrees clockwise and 270 degrees clockwise, and the predetermined direction is one or plural among the horizontal direction and vertical direction, it is possible to provide an advantageous effect that that image data for 3D display can be made versatile.

Further, since an image data reproducing apparatus for reproducing the plurality of images corresponding to the plurality of viewpoints, from image data of a predetermined data format, comprising: an analyzing means for analyzing the predetermined data format, wherein the analyzing means analyzes the integration information that indicates whether images from different viewpoints have been integrated or not and the image placement information that indicates the placement mode of the images having been integrated, and reproduces the plurality of images using the integration information and the placement mode of the images, it is possible to provide an advantageous effect that versatile image data can be displayed in accordance with the display device.

Since the image placement information is the information on the placement mode in which the placements of the viewpoint images are positioned by rotation of the predetermined angle, it is possible to provide an advantageous effect that versatile image data can be displayed in accordance with the display device.

Since the predetermined angle is one or plural among 0 degrees, 90 degrees clockwise, 180 degrees clockwise and 270 degrees clockwise, it is possible to provide an advantageous effect that versatile image data can be displayed in accordance with the display device.

Since the image placement information is composed of the placement direction information that indicates whether the images are arranged vertically or horizontally and the placement order information that indicates whether the images are arranged in the order of the viewpoints or in the reverse order of the viewpoints, it is possible to provide an advantageous effect that versatile image data can be displayed in accordance with the display device.

Since the image placement information is the information on the placement mode of the images in which the placements of the viewpoint images are positioned by rotation of the predetermined angle, the information on the placement mode of the images in which the positions of the images are inverted in the predetermined direction based on the positional relationship of the viewpoints, or the information on the combined mode of the two placement modes, it is possible to provide an advantageous effect that versatile image data can be displayed in accordance with the display device.

Since the predetermined angle is one or plural among 0 degrees, 90 degrees clockwise, 180 degrees clockwise and 270 degrees clockwise, and the predetermined direction is one or plural among the horizontal direction and the vertical direction, it is possible to provide an advantageous effect that versatile image data can be displayed in accordance with the display device.

BRIEF DESCRIPTION OF DRAWINGS

FIG. 3 is a diagram showing integrated examples of left and right images using rotation of an integrated image.

FIG. 4 is a diagram showing integrated examples of left and right images using rotation of every viewpoint image.

FIG. 5 is a chart showing a configurational example of information image placement mode.

FIG. 6 is a chart showing a configurational example of image placement mode information.

FIG. 7 is a chart showing a configurational example of image placement mode information.

FIG. 8 is a chart showing a configurational example of image placement mode information.

FIG. 9 is a chart showing a configurational example of image placement mode information.

FIG. 10 is a chart showing a configurational example of image placement mode information.

FIG. 15 is a diagram showing integrated examples of multi viewpoints images using rotation of an integrated image.

FIG. 16 is a diagram showing integrated examples of multi viewpoints images using rotation of every viewpoint image.

FIG. 17 is a chart showing a configurational example of image placement mode information.

FIG. 18 is a chart showing a configurational example of image placement mode information.

FIG. 19 is a chart showing a configurational example of image placement mode information.

FIG. 20 is a chart showing a configurational example of image placement mode information.

FIG. 23 is a diagram for illustrating the concept of a parallax barrier scheme.

FIG. 24 is a conceptual diagram showing one example of a recording data format for a lenticular scheme.

BEST MODE FOR CARRYING OUT THE INVENTION

The embodiments of the present invention will hereinbelow be described with reference to the drawings.

The First Embodiment

Figure 1:
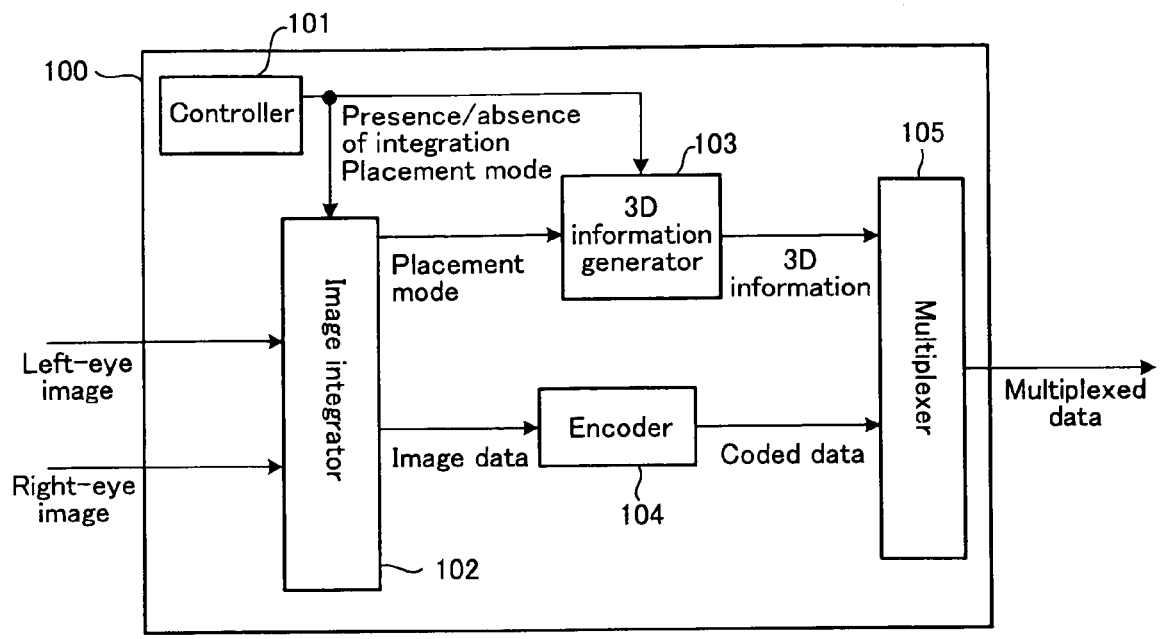
FIG. 1 is a block diagram showing a configuration of an image data generating apparatus in accordance with the first embodiment of the present invention.

FIG. 1 is a block diagram showing a configuration of an image data generating apparatus in accordance with the first embodiment of the present invention. In FIG. 1, an image data generating apparatus 100 includes: a controller 101 for designating whether the left-eye image and right-eye image are integrated or not and their placement mode when integration is implemented; an image integrator 102 for creating an integrated image of the left-eye image and right-eye image arranged appropriately; a 3D information generator 103 for creating 3D information by formatting, whether integration is implemented or not, and the placement mode of images when integration is done; an encoder 104 for encoding image data; and a multiplexer 105 having a means for having access to recording media and communications lines and multiplexing the image data and 3D information and outputting the result.

The operation of the thus configured image data generating apparatus 100 will be described.

An image signal stream composed of sequential frames is input to the image data generating apparatus frame by frame.

Figure 2:
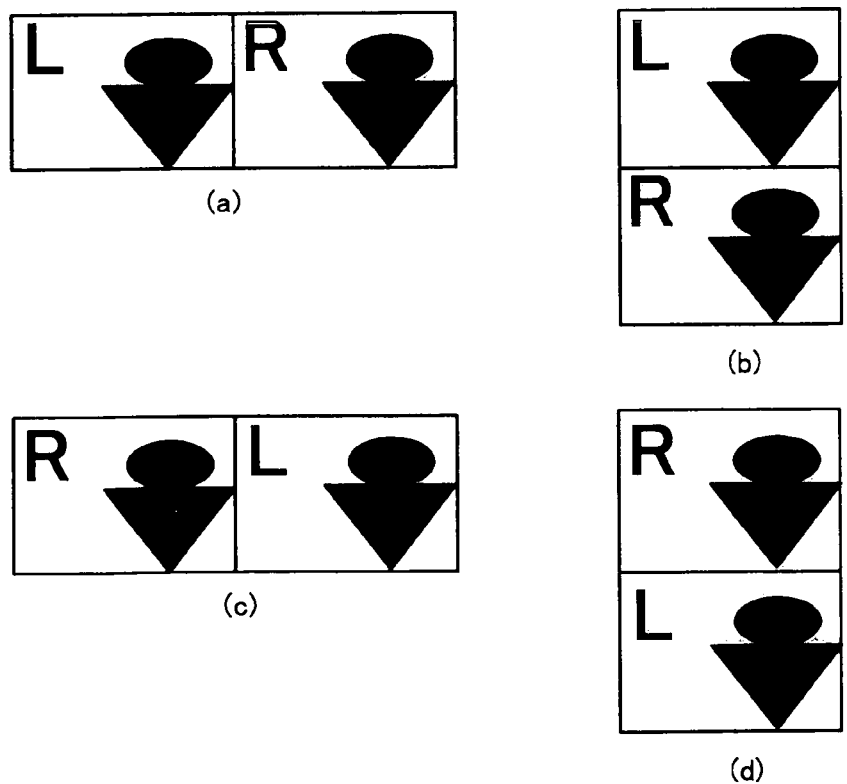
FIG. 2 is a diagram showing integrated examples of left and right images using rotated placement.

Controller 101 designates whether integration is implemented or not and the image placement mode when integration is done. Image integrator 102 generates image data having a format designated by the presence or absence of integration and the placement mode. FIG. 2 shows specific examples of placement modes herein. An image indexed with L at the upper left is a left-eye image, an image indexed with R at the upper left is a right-eye image. These are referred to as viewpoint images hereinbelow.

FIG. 2(a) shows a single integrated image with the left-eye image on the left and the right-eye image on the right. FIG. 2(b) shows a single integrated image with the left-eye image at the top and the right-eye image at the bottom. FIG. 2(c) shows a single integrated image with the left-eye image on the right and the right-eye image on the left. FIG. 2(d) shows a single integrated image with the left-eye image at the bottom and the right-eye image at the top. These four images shown in FIGS. 2(a) to (d) are images in which the positions of viewpoint images are rotated 90 degrees from one to another without the viewpoint images themselves being rotated. Therefore, a concept of "rotated placement" that indicates how the viewpoint images are laid out should be introduced so as to make unified expressions.

Specifically, FIG. 2(a) is an integrated image in which the images are arranged corresponding to the positions of the viewpoints, and this image should be referred to as a standard image or a 0 degree rotated placement image. The image in FIG. 2(b) should be referred to as a 90 degree clockwise rotated placement image, the image in FIG. 2(c) should be referred to as a 180 degree clockwise rotated placement image and the image in FIG. 2(d) should be referred to as a 270 degree clockwise rotated placement image.

A 180 degree clockwise rotated placement image, i.e., an image in which the left-eye image is arranged on the right and the right-eye image is arranged on the left has the advantage of presenting a stereo image when the image is displayed as it is on a normal display and seen by the "cross-eye method" or by the viewer becoming cross-eyed. In a case where a stereo image is generated by a device using the time-division scheme described in the conventional example, provision of data can be more easily done by sequentially joining one frame of data for the left-eye image with one frame of data for the right-eye image as in a case of the 90 degree clockwise rotated placement image or 270 degree clockwise rotated placement image, than by arranging data for the left-eye image and data for the right-eye image side by side for every line as in a case of the standard placement image or the 180 degree clockwise rotated placement image.

Further, other the concept of the rotated placement, other integrated images can be prepared by introducing other rotating methods, namely "rotation of the integrated image" and "rotation of every viewpoint image", FIG. 3(a) is an integrated image at the standard position or an image identical to FIG. 2(a). Rotating the integrated image 90 degrees clockwise from this position, results in the image shown in FIG. 3(b). Rotating the integrated image of FIG. 3(a) 180 degrees clockwise results in the image shown in FIG. 3(c). Rotating the integrated image of FIG. 3(a) 270 degrees clockwise results in the image shown in FIG. 3(d).

FIG. 4(a) is an integrated image at the standard placement or an image identical to FIG. 2(a). Rotating each and every viewpoint image separately 90 degrees clockwise from this position and integrating them results in the image shown in FIG. 4(b). Rotating each and every viewpoint image separately 180 degrees clockwise from FIG. 4(a) and integrating them results in the image shown in FIG. 4(c). Further, rotating each and every viewpoint image separately 270 degrees clockwise from FIG. 4(a) and integrating them results in the image shown in FIG. 4(d).

It should be noted that though rotated placement of the images, rotation of the integrated image and rotation of every viewpoint image are all independent events, it is possible to define one rotating method by combination of remaining two kinds of rotating methods, instead of defining the three kinds of rotating methods.

Illustratively, the image with each viewpoint image rotated 90 degrees clockwise is the same as the image which is obtained by implementing a 270 degree clockwise rotated placement of the integrated image first and then rotating the resulting image 90 degrees clockwise. The same image can be also obtained by implementing the operations in the reverse order, specifically rotating the integrated image 90 degrees clockwise first and implementing a 270 degrees clockwise rotated placement of the resultant image. That is, the image with each viewpoint image rotated 90 degrees clockwise can be expressed as an image obtained by the combination of a 270 degree clockwise rotated placement and a 90 degree clockwise rotation of the integrated image. Similarly, the image with each viewpoint image rotated 180 degrees clockwise can be expressed as an image obtained by the combination of a 180 degree clockwise rotated placement and a 180 degree clockwise rotation of the integrated image; and the image with each viewpoint image rotated 270 degrees clockwise can be expressed as an image obtained by the combination of a 90 degree clockwise rotated placement and a 270 degree clockwise rotation of the integrated image. In sum, the information as to a rotation of every viewpoint image can be expressed if information as to rotated placement and information as to rotation of the integrated image are obtained.

Considering likewise, the integrated image, rotated 90 degrees clockwise can be expressed as an image obtained by the combination of a 90 degree clockwise rotated placement and a 90 degree clockwise rotation of every viewpoint image; the integrated image, rotated 180 degrees clockwise can be expressed as an image obtained by the combination of a 180 degree clockwise rotated placement and a 180 degree clockwise rotation of every viewpoint image; and the integrated image, rotated 270 degrees clockwise can be expressed as an image obtained by the combination of a 270 degree clockwise rotated placement and a 270 degree clockwise rotation of every viewpoint image. In sum, the information as to a rotation of the integrated image can be expressed if information as to rotated placement and information as to rotation of every viewpoint image are given.

Similarly, the image after a 90 degrees clockwise rotated placement can be expressed as an image obtained by the combination of a 90 degree clockwise rotation of the integrated image and a 270 degree clockwise rotation of every viewpoint image; the image after a 180 degrees clockwise rotated placement can be expressed as an image obtained by the combination of a 180 degree clockwise rotation of the integrated image and a 180 degree clockwise rotation of every viewpoint image; the image after a 270 degrees clockwise rotated placement can be expressed as an image obtained by the combination of a 270 degree clockwise rotation of the integrated image and a 90 degree clockwise rotation of every viewpoint image. In sum, the information as to a rotated placement can be expressed if information as to rotation of the integrated image and information as to rotation of every viewpoint image are given.

3D information generator 103 generates 3D information necessary for image display in a 3D image representation, by formatting the presence/absence of integration and the placement mode. Information as to placement mode may be recorded by defining indexes for identification of the above-described four placement modes as shown in FIG. 5 and recording the index as it is. If the integration presence/absence indicator indicates "integration absent", the information as to the placement mode has no meaning; in this case, information as to placement mode may be omitted or may be defined to be invalid even if it exists. Alternatively, the information as to the presence/absence of integration and the information as to placement mode may be put together so as to be handled as a piece of information and indexed as shown in FIG. 6. Instead of defining all the four kinds of placement modes, the placement modes likely to be used may be defined alone. For example, three kinds of rotated placements, e.g., the standard placement, the 90 degrees clockwise rotated placement and the 270 degrees clockwise rotated placement, alone may be defined, or two kinds of rotated placements, namely, the standard placement and the 180 degrees clockwise rotated placement, alone may be defined.

Instead of using the concept of rotated placement, the arrangement may also be defined by combination of the placement direction information that indicates whether the images are arranged side by side or top and bottom and the placement order information that indicates whether the images are arranged in viewpoint order or in the reverse order. Specifically, in the case where the direction of placement is designated as the left and right direction and the order of placement is designated as the order of viewpoints, the case shows the standard placement; in the case where the direction of placement is designated as the left and right direction and the order of placement is designated as the reverse order of viewpoints, the case shows the 180 degrees clockwise rotated placement; in the case where the direction of placement is designated as the top and bottom direction and the order of placement is designated as the order of viewpoints, the case shows the 90 degrees clockwise rotated placement; and in the case where the direction of placement is designated as the top and bottom direction and the order of placement is designated as the reverse order of viewpoints, the case shows the 270 degrees clockwise rotated placement. In the case of this method, the index identifying the direction of placement and the index identifying the order of placement may be defined separately as shown in FIGS. 7(a) and 7(b), so that these indices may be recorded as they are. Alternatively, as shown in FIG. 7(c) it is also possible to indicate a placement mode in an integral manner by assigning a certain bit for the information on the direction of placement and another bit for the information on the order of placement, in a piece of information on placement mode.

Since the information on the rotated placement, the information on rotation of the integrated image and the information on rotation of every viewpoint image are completely independent, for each of the three kinds of information four indices identifying the types of placement methods or rotational methods may be defined as shown in FIGS. 8(a), 8(b) and 8(c), and the indices may be recorded as they are. Alternatively, as stated above, if any of two kinds of information are defined instead of defining all the three kinds of information, the remaining one kind of information can be derived. Therefore, those defined in FIGS. 8(a) and 8(b), for example may be used for the indices for identification. Alternatively, the image at the standard placement and the images without rotation are all represented by the same standard image, three pieces of information may be integrated so as to define the indices that each identify the placement mode and the rotational method, as shown in FIG. 9. It is also possible to use two separate fields, as shown in FIGS. 10(a) and 10(b), one for defining an index that represents the rotational method, that is, whether the integrated image is obtained by rotated placement, whether the image is obtained by rotating the integrated image, or whether the image is obtained by rotating every viewpoint image, and one for defining another index that represents the angle of rotation for the designated rotational method. In FIG. 10, though the index for "non-rotation" is given for the field identifying the rotational method in order to describe the standard image, it is also possible to define an index that indicates "0 degree rotation" for the field for defining the angle of rotation, to represent the standard image.

Further, the 3D information may use the set value as it is or may use that coded by fixed length coding or variable length coding.

Encoder 104 encodes the image data generated by image integrator 102 to prepare coded data. As the coding method, international standard schemes such as JPEG, JPEG2000 and the like should be used for still images. For motion pictures, international standard schemes such as MPEG-1, MPEG-2, MPEG-4 and the like should be used. When encoding of motion pictures is implemented using intra-frame coding only, Motion JPEG and similar schemes may be used. As for the image coding methods, not limited to the above, non-standard schemes may be used or encoding may be implemented without compression. In FIG. 1, only a single encoder is given, but encoders as many as the number of viewpoints may be present taking into consideration the case where no integration of images is carried out.

Multiplexer 105 converts the encoded data prepared by encoder 104 and the 3D information prepared by the 3D information generator into a predetermined format and outputs the result to the outside. Though not illustrated in FIG. 1, if sound and/or text are multiplexed these pieces of data are also multiplexed at multiplexer 105.

The output from multiplexer 105 is connected to recording devices such as IC memories, magneto-optical disks, magnetic tape, hard disks and the like, and/or communications devices such as LAN, modems and others. Here, it is assumed that an IC memory is connected to multiplexer 105. Next, the recording format used in this case will be described.

Generally, when an IC memory is used as a recording medium, a file system such as FAT (File Allocation Table) etc., is constructed on the IC memory and data is recorded as a file. As the file format used herein an existing one or a newly defined unique format may be used. When an existing format is used, a function of header extension (here, the extended header is called an extension header) is generally provided for the existing format, hence the 3D information is to be recorded as part of the existing file header, using the function. In this case, the extensions generally used (e.g., an extension "jpg" is used generally in a case of a JPEG file) should be directly employed. This arrangement makes it possible for even a conventional player having no 3D image display function to recognize the file as a file with an existing format and display it as a 2D image. On the other hand, when a new format is employed, the 3D information should be recorded at a predetermined location of a file. Further, in order to indicate a file as having a new format, a unique extension which is distinguishable from files with existing formats should be added.

Next, a reproducing apparatus for displaying the image data prepared by image data generating apparatus 100 as a 3D image will be described.

Figure 11:
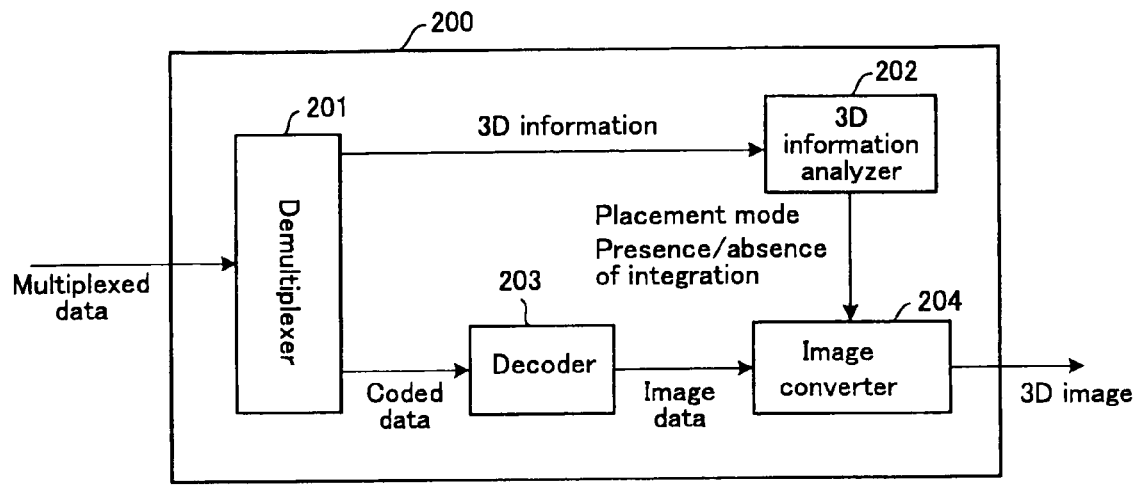
FIG. 11 is a block diagram showing a configuration of an image data reproducing apparatus according to the first embodiment of the present invention.

FIG. 11 is a block diagram showing a configuration of an image data reproducing apparatus in accordance with the first embodiment of the present invention. In FIG. 11, an image data reproducing apparatus 200 is composed of a demultiplexer 201 for separating multiplexed data, a 3D information analyzer 202 for analyzing 3D information, a decoder 203 for decoding coded data and an image converter 204 for converting image data into a display format.

With regard to the thus configured image data reproducing apparatus 200, the operation will be described.

Demultiplexer 201 reads multiplexed data which has been multiplexed in a predetermined format, from a recording device, or a communications device and separates it into coded data and 3D information. Though not illustrated in FIG. 11, when sound and/or text have been multiplexed, these pieces of data are also separated through demultiplexer 201. Here, it is assumed that an IC memory is connected to demultiplexer 201. As already stated, an image file is recorded into the IC memory in an existing format or in a new format. Since it is possible to discriminate new formats from existing formats based on file extensions, when a file to be reproduced has an existing format, 3D information is read out from the extension area of the file header. When a file having a new format is to be reproduced, 3D information is read out from the predetermined area in the file.

Three-dimensional information analyzer 202 analyzes the 3D information and extracts information as to presence/absence of integration and placement mode.

Decoder 203 decodes image data from the coded data that has been separated by demultiplexer 201.

Connected to image converter 204 may be various types of display devices having different display formats, such as 2-dimensional display devices using ordinary CRTs or liquid crystal panels, stereoscopic display systems using lenticular scheme, parallax barrier scheme, time-division method, etc. Image converter 204, based on the presence/absence of integration and placement mode, converts the separated image data into a display format.

In the above way, it is possible to make the recorded three-dimensional image data versatile and make the identical three-dimensional image data usable for different three-dimensional display systems, by adding to a multimedia information file containing 3-dimensional image data, 3D information that represents whether the three-dimensional image data has been integrated and in what way every viewpoint image is arranged if the data has been integrated, and displaying the data on a three-dimensional image reproducing apparatus after implementing appropriate conversion in accordance with the data characteristics obtained from the 3D information.

The Second Embodiment

Figure 12:
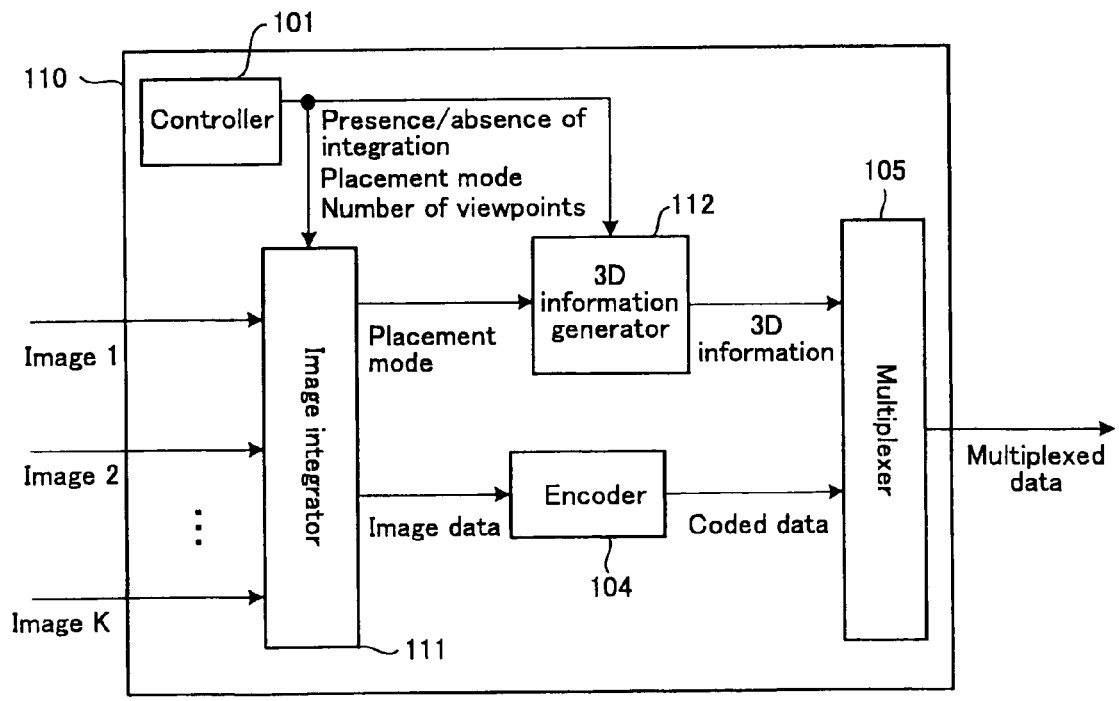
FIG. 12 is a block diagram showing a configuration of an image data generating apparatus according to the second embodiment of the present invention.

FIG. 12 is a block diagram showing a configuration of an image data generating apparatus according to the second embodiment of the present invention. Though the first embodiment is described with reference to the case having two viewpoints, the present invention can also be applied to so-called multi-viewpoint cases where there are three or more viewpoints. This embodiment handles a multi-viewpoint configuration. In FIG. 12, the same components as those in FIG. 1 are allotted with the same reference numerals. An image data generating apparatus 110 includes: a controller 101; an image integrator 111 for, in accordance with the instruction of controller 101, allocating images 1 to K viewed from multiple view points (here K is the number of viewpoints and an integer equal to or greater than 2) at appropriate positions so as to generate an integrated image; a 3D information generator 112 for creating 3D information by formatting the information on whether integration is implemented or not, the placement mode of images when integration is done and the number of viewpoints; an encoder 104; and a multiplexer 105.

Figure 13:
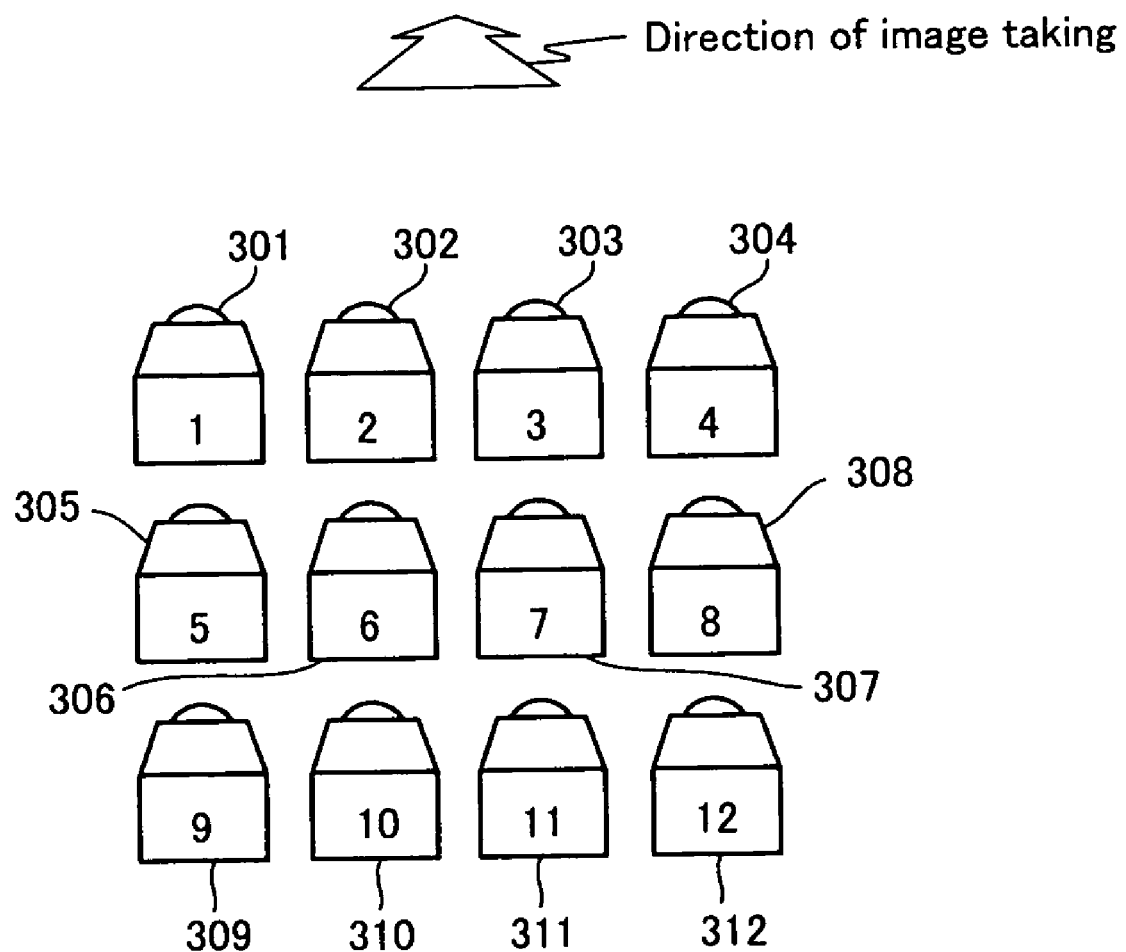
FIG. 13 is a diagram showing an example of how viewpoint numbers are allotted.

The operation of the thus configured image generating apparatus 110 will be described. Image generating apparatus 110 is connected to two or more number of imaging devices for input of image data. These imaging devices are arranged in gridlike fashion with M units horizontally and N units vertically (here M and N are integers equal to or greater than one, and M×N=K), each image device is allotted with a number (viewpoint number). FIG. 13 shows an example of arrangement where the devices are arranged in gridlike fashion with four units horizontally and three unit vertically, forming 12 viewpoints in total (a view in which the arrayed imaging devices are overlooked from the rear). Here, the viewpoint numbers are assigned from left to right and top to bottom. Specifically, 1 is assigned to imaging device 301, 2 to imaging device 302, 3 to imaging device 303 and 4 to imaging device 304. Similarly, 5 to 12 are assigned to imaging devices 305 to 312, respectively.

Controller 101 designates the presence/absence of integration, the placement mode of images, the number M of viewpoints in the horizontal direction and the number N of viewpoints in the vertical direction. Since the method of designation is the same as the first embodiment, description is omitted here.

Figure 14:
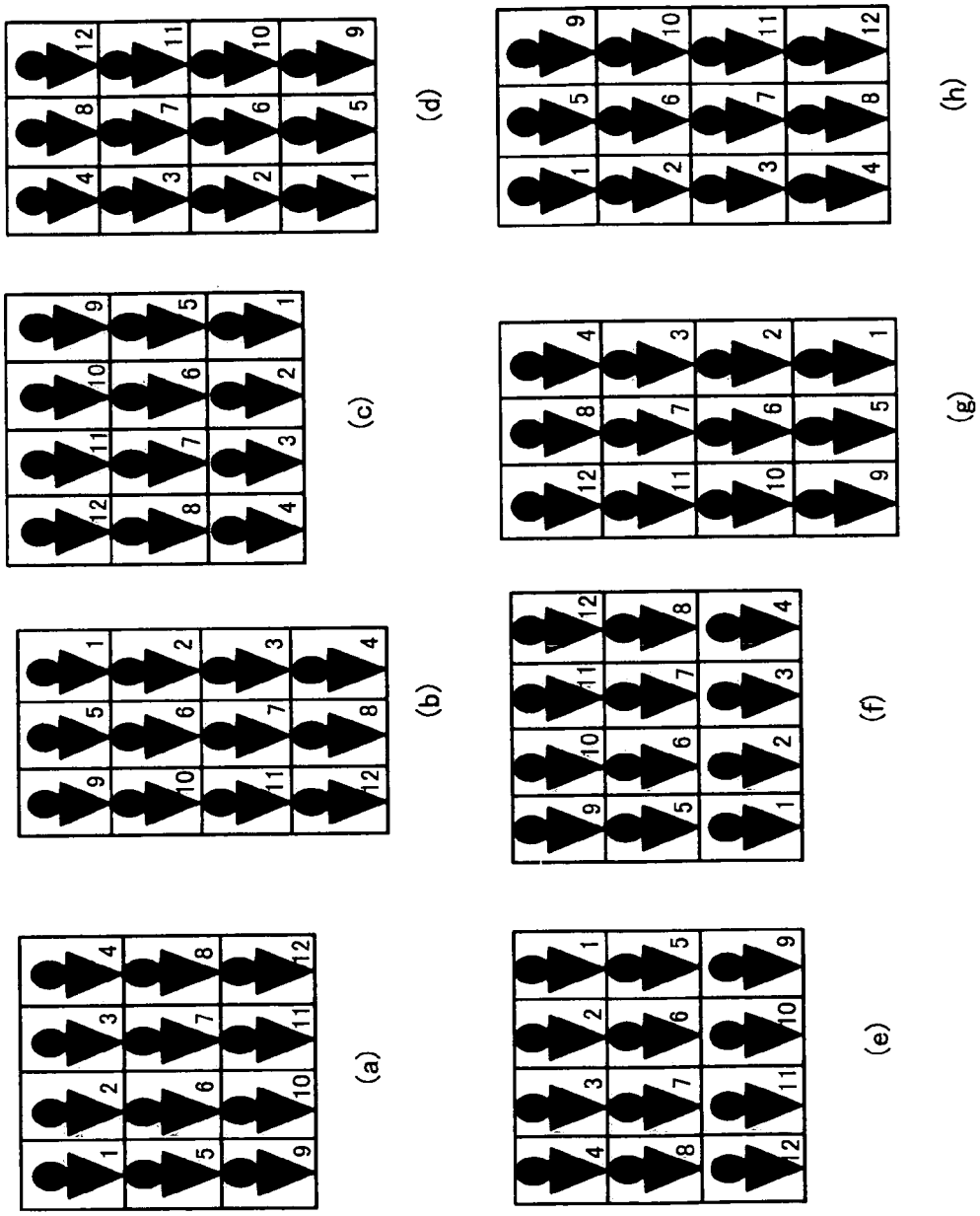
FIG. 14 is a diagram showing integrated examples of multi viewpoints images using rotated placement.

Image integrator 111 selects placement mode of input images 1 to K when the input as to the presence/absence of integration from controller 101 indicates "integration is present". There can be eight kinds of placement modes, which are specifically shown in FIG. 14. This diagram shows an example where four viewpoints (M=4) are arranged horizontally and three viewpoints (N=3) are arranged vertically while the number indexed at the lower right in each image is the viewpoint number.

FIG. 14(a) is an integrated image of multiple images where the images are arranged in the same manner as the corresponding imaging devices are arranged. When the placement position of an image is given by g(x,y) and the placement position of an imaging device is given by f(x,y), the two are related as follows:

$$g(x,y)=f(x,y),$$

$$(x=0, 1, \ldots M-1: y=0, 1, \ldots N-1),$$

where the x-coordinate in (x, y) indicates the position of a placement in the horizontal direction and y-coordinate indicates the position of a placement in the vertical direction, the coordinate has an origin at the top left and the positive x coordinates go to the right of the origin and the positive y coordinates go down.

FIG. 14(b) is one example of an integrated image of multiple images where the corresponding images are arranged by a 90 degree rotation clockwise from the arrangement of the imaging devices. The relationship between the placement positions of the images and the placement positions of the imaging devices can be defined as follows:

$$g(x,y)=f(y, N-1-x),$$

$$(x=0, 1, \ldots N-1: y=0, 1, \ldots M-1),$$

and this image placement mode should be called "90 degree clockwise rotated placement".

This placement mode is one that is extended from the method of 90 degree clockwise rotated placement described in the first embodiment so as to suit a multi-viewpoint configuration. In this placement mode, the topmost row of imaging device 1, imaging device 2, imaging device 3 and imaging device 4, arranged from the left are made to correspond to the rightmost column of image 1, image 2, image 3 and image 4, arranged from the top; and the leftmost column of imaging device 1, imaging device 5 and imaging device 9, arranged from the top are made to correspond to the topmost row of image 1, image 5 and image 9, arranged from the right. That is, only the placement positions change while the neighbor relations between images remain unchanged.

FIG. 14(c) is one example of an integrated image of multiple images where the corresponding images are arranged by a 180 degree rotation clockwise from the arrangement of the imaging devices. The relationship between the placement positions of the images and the placement positions of the imaging devices can be defined as follows:

$$g(x,y)=f(M-1-x, N-1-y),$$

$$(x=0, 1, \ldots M-1: y=0, 1, \ldots N-1),$$

and this image placement mode should be called "180 degree clockwise rotated placement".

In this placement mode, the topmost row of imaging device 1, imaging device 2, imaging device 3 and imaging device 4, arranged from the left are made to correspond to the bottommost row of image 1, image 2, image 3 and image 4, arranged from the right; and the leftmost column of imaging device 1, imaging device 5 and imaging device 9, arranged from the top are made to correspond to the rightmost column of image 1, image 5 and image 9, arranged from the bottom.

FIG. 14(d) is one example of an integrated image of multiple images where the corresponding images are arranged by a 270 degree rotation clockwise from the arrangement of the imaging devices. The relationship between the placement positions of the images and the placement positions of the imaging devices can be defined as follows:

$$g(x,y)=f(M-1-y, x),$$

$$(x=0, 1, \ldots N-1: y=0, 1, \ldots M-1),$$

and this image placement mode should be called "270 degree clockwise rotated placement".

In this placement mode, the topmost row of imaging device 1, imaging device 2, imaging device 3 and imaging device 4, arranged from the left are made to correspond to the leftmost column of image 1, image 2, image 3 and image 4, arranged from the bottom; and the leftmost column of imaging device 1, imaging device 5 and imaging device 9, arranged from the top is made to correspond to the bottommost row of image 1, image 5 and image 9, arranged from the left.

FIG. 14(e) is one example of an integrated image of multiple images where the corresponding images are arranged by inverting the placement positions of the imaging devices the left-side right. The relationship between the placement positions of the images and the placement positions of the imaging devices can be defined as follows:

$$g(x,y)=f(M-1-x, y),$$

$$(x=0, 1, \ldots M-1; y=0, 1, \ldots N-1),$$

and this image placement mode should be called "left and right inverted placement".

In this placement mode, the topmost row of imaging device 1, imaging device 2, imaging device 3 and imaging device 4, arranged from the left still corresponds to the topmost row of image 1, image 2, image 3 and image 4, but arranged from the right; and the leftmost column of imaging device 1, imaging device 5 and imaging device 9, arranged from the top is made to correspond to the rightmost column of image 1, image 5 and image 9, arranged from the top.

FIG. 14(f) is one example of an integrated image of multiple images where the corresponding images are arranged by inverting the placement positions of the imaging devices top to the bottom. The relationship between the placement positions of the images and the placement positions of the imaging devices can be defined as follows:

$$g(x,y)=f(x, N-1-y),$$

$$(x=0, 1, \ldots M-1; y=0, 1, \ldots N-1),$$

and this image placement mode should be called "top to bottom inverted placement".

In this placement mode, the topmost row of imaging device 1, imaging device 2, imaging device 3 and imaging device 4, arranged from the left are made to correspond to the bottommost row of image 1, image 2, image 3 and image 4, arranged from the left; and the leftmost column of imaging device 1, imaging device 5 and imaging device 9, arranged from the top remains to correspond to the leftmost column of image 1, image 5 and image 9, but arranged from the bottom.

FIG. 14(g) is one example of an integrated image of multiple images where the corresponding images are arranged by rotating the arrangement of the imaging devices 90 degree clockwise and then inverting the arrangement top to bottom. The relationship between the placement positions of the images and the placement positions of the imaging devices can be defined as follows:

$$g(x,y)=f(M-1-y, N-1-x),$$

$$(x=0, 1, \ldots N-1; y=0, 1, \ldots M-1),$$

and this image placement mode should be called "90 degree clockwise rotating and top to bottom inverted placement".

In this placement mode, the topmost row of imaging device 1, imaging device 2, imaging device 3 and imaging device 4, arranged from the left are made to correspond to the rightmost column of image 1, image 2, image 3 and image 4, arranged from the bottom; and the leftmost column of imaging device 1, imaging device 5 and imaging device 9, arranged from the top are made to correspond to the bottommost row of image 1, image 5 and image 9, arranged from the right.

FIG. 14(h) is one example of an integrated image of multiple images where the corresponding images are arranged by rotating the arrangement of the imaging devices 90 degree clockwise and then inverting the arrangement the left side right. The relationship between the placement positions of the images and the placement positions of the imaging devices can be defined as follows:

$$g(x,y)=f(y, x),$$

$$(x=0, 1, \ldots N-1; y=0, 1, \ldots M-1),$$

and this image placement mode should be called "90 degree clockwise rotating and left and right inverted placement".

In this placement mode, the topmost row of imaging device 1, imaging device 2, imaging device 3 and imaging device 4, arranged from the left are made to correspond to the left most column of image 1, image 2, image 3 and image 4, arranged from the top; and the leftmost column of imaging device 1, imaging device 5 and imaging device 9, arranged from the top are made to correspond to the topmost row of image 1, image 5 and image 9, arranged from the left.

One from these eight kinds of image placement modes is selected.

The eight types of images shown in FIGS. 14(a) to (f) can also be represented by combination of four kinds of rotated placement and presence/absence of horizontal inversion. Specifically, each image shown in FIGS. 14(a) to (d) is represented by combination of the standard placement, 90 degree clockwise rotated placement, 180 degree clockwise rotated placement or 270 degree clockwise rotated placement with non-horizontal inversion. FIG. 14(e) is an image represented by combination of the standard placement and horizontal inverted placement, FIG. 14(f) is an image represented by combination of 180 degree clockwise rotated placement and horizontal inverted placement, FIG. 14(g) is an image represented by combination of 270 degree clockwise rotated placement and horizontal inverted placement, and FIG. 14(h) is an image represented by combination of 90 degree clockwise rotated placement and horizontal inverted placement.

It was described above that the eight kinds of images can be represented by combination of four kinds of rotated placement and presence/absence of left-side-right inversion, but it is also possible to represent the eight kinds of images by combination of four kinds of rotated placement and presence/absence of top to bottom inversion.

Further, instead of using the idea of rotated placement, other integrated images can be generated by introduction of other rotating methods, namely "rotation of the integrated image" and "rotation of every viewpoint image" in the same manner as in the first embodiment.

FIG. 15(a) is an integrated image with the standard placement or an image identical to FIG. 14(a). Rotating the integrated image 90 degrees clockwise from this position, results in FIG. 15(b). Rotating the integrated image of FIG. 15(a) 180 degrees clockwise results in the image shown in FIG. 15(c). Rotating the integrated image of FIG. 15(a) 270 degrees clockwise results in the image shown in FIG. 15(d).

FIG. 16(a) is an integrated image with the standard placement or an image identical to FIG. 14(a). Rotating each and every viewpoint image separately 90 degrees clockwise from this position and integrating them, results in the image shown in FIG. 16(b). Rotating each and every viewpoint image of FIG. 16(a) separately 180 degrees clockwise from this position and integrating them, results in the image shown in FIG. 16(c). Rotating each and every viewpoint image of FIG. 16(a) separately 270 degrees clockwise from this position and integrating them, results in the image shown in FIG. 16(d).

The operation of encoder 104 is the same as that in the first embodiment, so that description is omitted.

Three-dimensional information generator 113 generates 3D information necessary for image display in a 3D image representation, by formatting the coded data prepared in encoder 104, the presence/absence of integration, placement mode and number of viewpoints designated by controller 101. For information as to placement mode, the indexes for identifying the above-described eight placement modes can be defined as shown in FIG. 17 so that the index may be recorded as it is. If the integration presence/absence indicator indicates "integration absent", information as to placement mode has no meaning; in this case, information as to placement mode may be omitted or may be defined to be invalid even if the information exists. Alternatively, the information as to the presence/absence of integration and the information as to placement mode may be put together so as to be handled as a piece of information and indexed as shown in FIG. 18. Instead of defining all the eight kinds of placement modes, the placement modes likely to be used may be defined alone. For example, four kinds of rotated placements, e.g., the standard placement, the 90 degrees clockwise rotated placement, left and right inverted placement and top to bottom inverted placement, alone may be defined.

Since, as already described, the eight kinds of images can be represented by the combination of four kinds of rotated placement and presence/absence of left-side right inversion, the index for identifying one of four kinds of rotated placements and the index for identifying the presence/absence of left and right inversion may be defined separately as shown in FIGS. 19(a) and 19(b). Alternatively, as shown in FIGS. 20(a) and 20(b), information as to presence/absence of integration and information as to rotated placement may be put together and handled as a single piece of information and information as to presence/absence of left and right inversion may be defined independently from the former information. The indexes of FIGS. 19 and 20 may be defined with top to bottom inversion instead of left and right inversion.

As in the first embodiment, information as to rotated placement, information as to rotation of the integrated image and information as to rotation of every viewpoint image may be adapted to be selectable independently or may be put together so that they can be handled as a single piece of information. Further, when 3D information is prepared, the set values may be used directly or may be coded by fixed length coding or variable length coding.

The operation of multiplexer 105 is the same as that in the first embodiment, so that description is omitted herein.

Next, a reproducing apparatus for displaying the image data prepared by image data generating apparatus 110 as a 3D image will be described.

Figure 21:
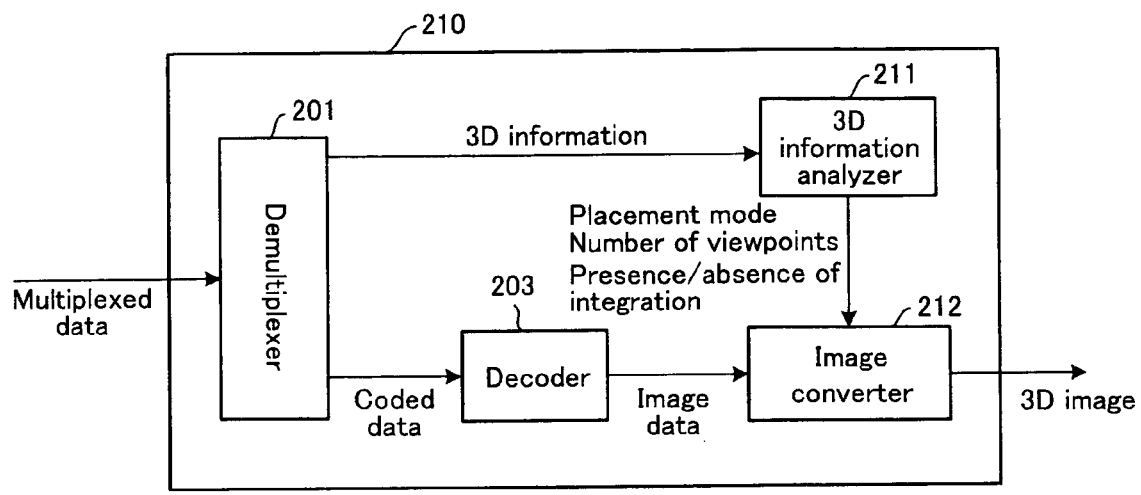
FIG. 21 is a block diagram showing a configuration of an image data reproducing apparatus in accordance with the second embodiment of the present invention.
Figure 22:
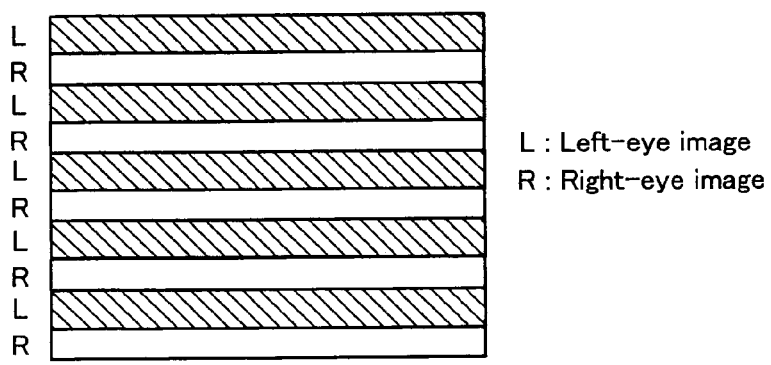
FIG. 22 is a diagram showing an image display format in a time-division scheme.

FIG. 21 is a block diagram showing a configuration of an image data reproducing apparatus in accordance with the second embodiment of the present invention. In FIG. 21, an image data reproducing apparatus 210 is composed of a demultiplexer 201, a 3D information analyzer 211 for analyzing 3D information, a decoder 203 for decoding encoded data and an image converter 212 for converting the decoded image data into a display format.

With regard to the thus configured image data reproducing apparatus 210, the operation will be described.

The operation of demultiplexer 201 is the same as that of the first embodiment so that description is omitted herein.

Three-dimensional information analyzer 211 analyzes 3D information and extracts presence/absence of integration, placement mode and number of viewpoints.

The operation of decoder 203 is the same as that of the first embodiment, so that description is omitted herein.

Image converter 212 converts the decoded image data into a display format in accordance with the presence/absence of integration, placement mode and number of view points extracted through 3D information analyzer 211. The display format is the same as that of the first embodiment, so that description is omitted herein.

When the thus multiplexed image data of multi viewpoints is reproduced by image data reproducing apparatus 200 in FIG. 11, in order to implement display of a 3D image two viewpoints should be selected from the images at multiple viewpoints so as to designate the left-eye and right-eye images. When image data is recorded by the imaging devices in FIG. 13, two devices such as 1 and 2, 2 and 3, 3 and 4, which are horizontally arranged, may be selected. If the images are rotated 90 degrees upon display, pairs of devices 1 and 5, 2 and 6, 3 and 7, and 4 and 8 may be selected to render 3D image display.

As described heretofore, similarly to the first embodiment, various types of data prepared by different kinds of 3D image-taking methods can be handled integrally while the data can be displayed normally as a 2D image on a conventional player having no 3D image display function, hence the data can be made versatile.

INDUSTRIAL APPLICABILITY

The image data generating apparatus and image data reproducing apparatus for reproducing the data in accordance with the present invention are suitable for video, video camera, digital camera and the like which are capable of making image data for 3D display versatile by adding attribute information to the image data when the image for 3D display is prepared.

The invention claimed is:

1. An image data generating apparatus for generating image data of a predetermined data format from a plurality of images corresponding to a plurality of viewpoints, comprising:
   an information generating means for generating an integration information that indicates whether images from different viewpoints have been integrated into a single image or not and an image placement information that indicates a placement relationship of the images from the different viewpoints inside of the single integrated image when the images from the different viewpoints are integrated into the single image,
   wherein the data format includes the integration information and the image placement information, and
   the image placement information includes information on the placement relationship in which the viewpoint images we positioned by rotation of a predetermined angle, and a placement order information that indicates whether the images are arranged in an order of the viewpoints or in a reverse order of the viewpoints.

2. The image data generating apparatus according to claim 1, wherein the predetermined angle is one or plural among 0 degrees, 90 degrees clockwise, 180 degrees clockwise and 270 degrees clockwise.

3. The image data generating apparatus according to claim 1, wherein the image placement information includes a placement direction information that indicates whether the images are arranged vertically or horizontally.

4. The image data generating apparatus according to claim 1, wherein the image placement information is information on the placement relationship of the images in which placements of the viewpoint images are positioned by rotation of a predetermined angle, information on the placement relationship of the images in which positions of the images are inverted in a predetermined direction based on a positional relationship of the viewpoints, or information on a combined relationship of the two placement relationships.

5. The image data generating apparatus according to claim 4, wherein the predetermined angle is one or plural among 0 degrees, 90 degrees clockwise, 180 degrees clockwise and 270 degrees clockwise, and the predetermined direction is one or plural among a horizontal direction and a vertical direction.

6. An image data reproducing apparatus for reproducing a plurality of images corresponding to a plurality of viewpoints, from image data of a predetermined data format, comprising:

an analyzing means for analyzing the predetermined data format, wherein the analyzing means analyzes an integration information that indicates whether images from different viewpoints have been integrated into a single image or not and an image placement information that indicates a placement relationship of the images from the different viewpoints inside of the single integrated image, and reproduces the plurality of images using the integration information and the image placement information, and the image placement information includes information on the placement relationship in which the viewpoint images are positioned by rotation of a predetermined angle, and a placement order information that indicates whether the images are arranged in an order of the viewpoints or in a reverse order of the viewpoints.

7. The image data reproducing apparatus according to claim 6, wherein the predetermined angle is one or plural among 0 degrees, 90 degrees clockwise, 180 degrees clockwise and 270 degrees clockwise.

8. The image data reproducing apparatus according to claim 6, wherein the image placement information includes a placement direction information that indicates whether the images are arranged vertically or horizontally.

9. The image data reproducing apparatus according to claim 6, wherein the image placement information is information on the placement relationship of the images in which placements of the viewpoint images are positioned by rotation of a predetermined angle, information on the placement relationship of the images in which positions of the images are inverted in a predetermined direction based on a positional relationship of the viewpoints, or information on a combined relationship of the two placement relationships.

10. The image data reproducing apparatus according to claim 9, wherein the predetermined angle is one or plural among 0 degrees, 90 degrees clockwise, 180 degrees clockwise and 270 degrees clockwise, and the predetermined direction is one or plural among a horizontal direction and a vertical direction.

* * * * *